United States Patent Office 2,701,785
Patented Feb. 8, 1955

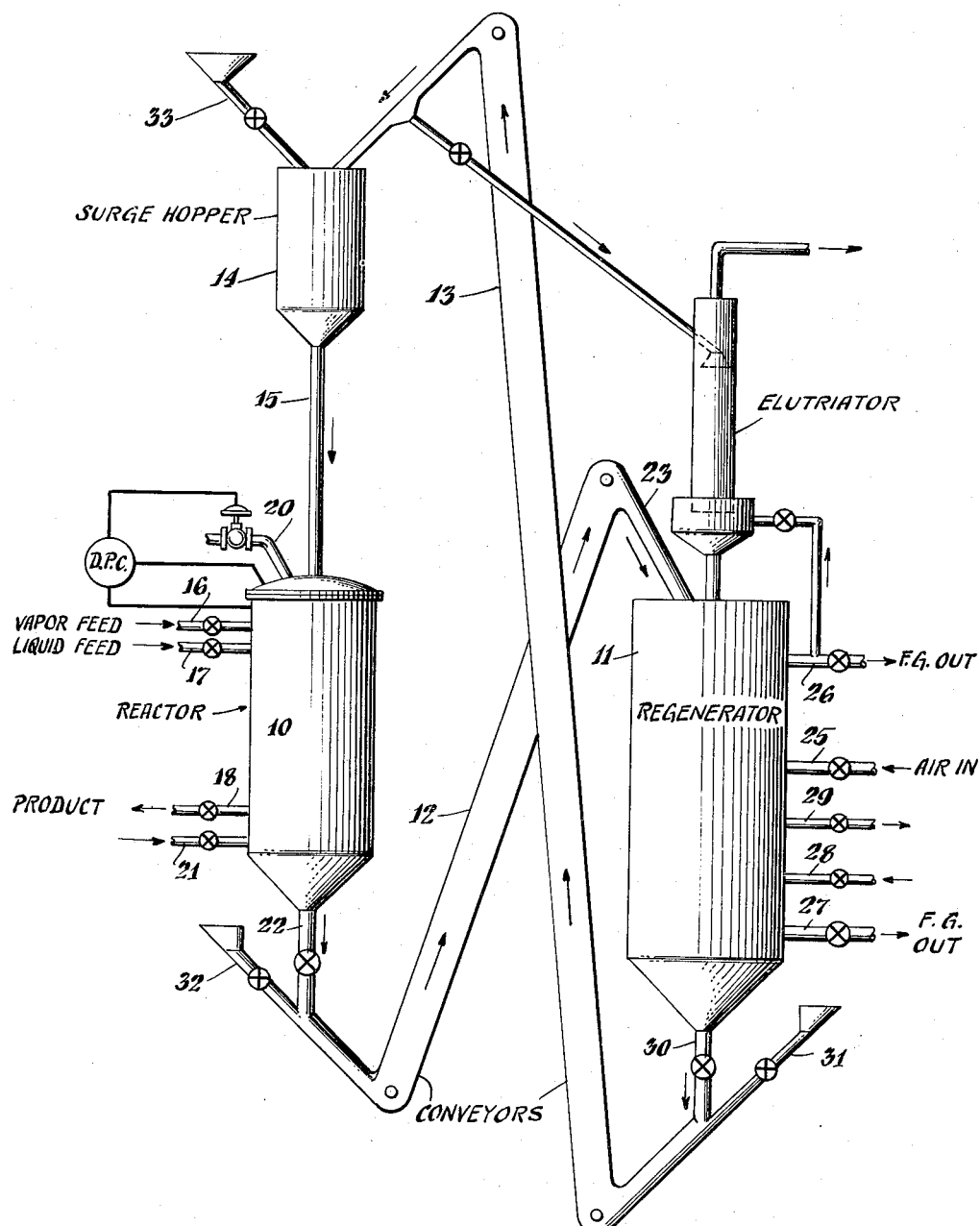

2,701,785

METHOD FOR CATALYTIC CONVERSION OF HYDROCARBONS

Charles H. Lechthaler, Woodbury, N. J., assignor to Socony-Vacuum Oil Company, Incorporated, a corporation of New York Application January 11, 1952, Serial No. 266,007

5 Claims. (Cl. 196—52)

This invention relates to processes for conversion of hydrocarbons in the presence of porous granular catalysts. It deals particularly with an improved method for handling the catalyst in such processes.

Typical of the processes to which this invention applies are the catalytic cracking, reforming, aromatization, dehydrogenation, hydrogenation, desulfurization, alkylation, polymerization, isomerization and treating of hydrocarbons. An example is the catalytic cracking of petroleum fractions, it being well known that petroleum fractions such as gas oils when subjected to a suitable catalyst at temperatures within the range 750–1000° F. and pressures usually above atmospheric are converted into lower boiling gasoline containing products while a coky contaminant is deposited on the catalyst. The catalyst is, therefore, subjected alternately to hydrocarbon conversion and contaminant burning steps. These cyclic processes have in the past been conducted both with stationary and moving catalysts. While this invention is considered inclusive of both in its broadest aspects, it is nevertheless more particularly concerned with moving catalyst processes, especially those employing granular catalysts for reasons which will become apparent hereinafter.

The catalysts employed may take the form of natural or treated clays, bauxites, zeolites and natural or synthetic associations of silica, alumina, or silica and alumina. Also, the catalytic compounds may include one or more of the oxides, sulfides or chlorides of such metals as aluminum, tungsten, vanadium, chromium, molybdenum, manganese, magnesium, etc., the composition depending upon the particular reaction involved. The catalyst in finely divided condition may be in powdered form or in palpable particulate form such as pellets, spheres, tablets, pills or irregular shaped particles. The term granular as employed herein is employed in a broad sense as covering all of this material of palpable particulate form as opposed to powder. This invention broadly includes processes employing powdered catalyst but in its preferred form the invention deals particularly with processes employing granular catalysts, particularly catalysts containing a substantial amount of inorganic oxide material selected from the group consisting of silica, alumina, and silica and alumina.

It has been found that the volume of the catalyst contained in a catalytic conversion unit gradually diminishes over a long period of operation due to a number of reasons, the principal one being breakage and attrition of the catalyst to form dust which is either lost from or removed from the unit. This is particularly true in the case of moving catalyst processes, and the periodic or continuous addition of fresh "make-up" catalyst to the unit is necessary in order to maintain catalyst levels in the cyclic system. It has been customary to "make-up" the catalyst loss or withdrawal from such systems with fresh catalyst which has substantially the same catalytic activity and properties as the original catalyst charge to the unit. It has now been discovered that when this practice is followed the rate of attrition and breakage of the freshly added "make-up" catalyst is excessive and all out of proportion to the rate of attrition and breakage of the main body of used catalyst within the system.

A major object of this invention is the provision in a cyclic catalytic conversion system of a method whereby the catalyst levels within the system may be maintained while avoiding the excessive attrition and breakage of "make-up" catalyst mentioned hereinabove.

Another object is the provision of an improved method for handling catalysts in a cyclic hydrocarbon conversion process.

These and other objects of this invention will become more apparent from the following discussion.

In one form, this invention involves a cyclic hydrocarbon conversion process wherein the catalyst levels are replenished when required by the addition of "make-up" catalyst having an activity not substantially above than that of the main body of catalyst in the cyclic system and substantially below that of the original catalyst charge to the system.

The invention may be most readily understood by reference to the attached drawing which is an elevational view of a typical catalytic conversion system to which this invention applies. The drawing is highly diagrammatic in form.

Referring now to the drawing, and consideration for purpose of illustration, a catalytic cracking process, there is shown a reactor 10, a regenerator 11 and suitable conveyors 12 and 13 for circulating the catalyst. The conveyors may be bucket elevators or pneumatic lifts, for example. The catalyst may be a spherical synthetic silica-alumina gel of about 4–20 mesh size by Tyler screen analysis. The catalyst flows from surge hopper 14 via gravity feed leg 15 into the reactor 10 through which it passes as a substantially compact bed. Vaporized hydrocarbon feed enters the upper section of the reactor via pipe 16 while a liquid feed may be supplied via pipe 17. Mixed gaseous products containing gasoline pass from the reactor via pipe 18; the term gaseous being employed herein in a broad sense as meaning material in the gaseous phase under the operating conditions involved regardless of what may be the phase of such material at ordinary atmospheric temperature and pressure. A steam of flue gas seal gas is supplied at pipe 20 and a steam or flue gas purge medium enters the lower section of the reactor via pipe 21, whereby escape of hydrocarbons through the catalyst flow conduits is prevented. Spent catalyst bearing a carbonaceous contaminant passes from the reactor via conduit 22 and is discharged from conveyor 12 into chute 23 feeding the regenerator. Regenerated catalyst passes downwardly through the regenerator 11 while being contacted with an oxygen containing gas such as air entering the kiln via pipe 25. Flue gas is withdrawn from both ends of the kiln via pipes 26 and 27. Heat is extracted from the kiln by means of the gas and catalyst throughout and also by means of cooling tubes which communicate with supply pipe 28 and coolant outlet pipe 29. Regenerated catalyst from which at least a substantial portion of the contaminant has been removed by combustion passes from the lower end of the kiln via conduit 30 and is returned to the surge hopper 14 by conveyor 13.

The details of internal construction of the several vessels of cyclic systems of the type described above are now well known to the art and need not be further discussed. Also, alternative arrangements which are considered to be within the scope of this invention are well known and need no further discussion. In general, for catalytic cracking the conversion zone is operated at a temperature within the range about 750–1050° F. while the regeneration zone is operated at temperatures ranging from 800–1200° F. for clay catalysts and from 800° F. to as high as 1400° F. for synthetic gel catalysts. The reactor and regenerator pressures may vary from atmospheric up to several hundred pounds per square inch, although for catalytic cracking moderate pressures are preferred. The hydrocarbon space velocity may range from about 0.5 to 10 volumes of oil per volume of catalyst per hour and the catalyst to oil ratio may vary within the range about 0.5 to 20 volumes of catalyst per volume of oil.

Referring again to the drawing, due to shrinkage of catalyst and gradual attrition and loss of catalyst from the system as fines, it is necessary to add fresh catalyst to the system from time to time in order to maintain constant the total volume of catalyst in the cyclically moving streams, i. e. in the cyclic system. The "make-up" catalyst may be added to the stream of regenerated catalyst in pipe 30 by means of feeder pipe 31 or it may be added to the spent catalyst stream via pipe 32. The fresh catalyst may also be added to other points of the system such as at surge hopper 14 via pipe 33. The "make-up" catalyst may be added continuously at a suitable controlled rate or from time to time as required to maintain catalyst levels in the cyclic system customary to "make-up" levels with catalyst of activity the same as that originally charged to the unit. Since the activity of the catalyst in the cyclic system gradually declines over a period of extended cyclic use from its original activity to a normal equilibrium activity, the "make-up" catalyst is customarily of higher cracking activity than the main portion of the catalyst in the cyclic system. It has been discovered that under those conditions the rate of attrition of the "make-up" catalyst is very substantially greater than that of the "equilibrium catalyst" in the unit. The reason for this is believed to lie in the fact that more coke deposits on the catalyst of higher activity during its passage through the reactor than upon the equilibrium catalyst. The regenerator is normally operated to remove the coke deposit from the main bulk of the catalyst and under these conditions, the freshly added catalyst would not be entirely freed of coke by the time it reaches the outlet of the regeneration zone. It has been discovered that serious breakage of catalyst can result in cyclic cracking operations due to high carbon deposit on the catalyst followed by incomplete carbon burn-off. This is shown by the data set forth in Table I. This data was obtained by subjecting a 4–8 mesh silica alumina bead catalyst (prepared by the method described in United States Patent 2,384,946, issued September 8, 1945 to Milton M. Marisic) to repeated cycles of hydrocarbon cracking and regeneration with air while controlling the operating conditions to provide the indicated deposits in the catalyst. The catalyst employed for this test had an activity index of about 46.

Table I

| Carbon Deposit on Catalyst, Percent By Weight | | Number of Cycles | Breakage, Percent Weight |
| --- | --- | --- | --- |
| After Cracking | After Regeneration | | |
| 3 | 2.5 | 4 | 0 |
| 5 | 2.0 | 4 | 15 |
| 5 | 0.3 | 4 | 0 |
| 7 | 2.0 | 4 | 35 |
| 7 | 0.9 | 4 | 7 |
| 5 | 2 | 10 | 40 |

When bead catalysts having activity indices of 46 and 41 were subjected to cyclic operation under identical cracking and regeneration conditions, it was found that more coke formed on the higher activity catalyst and that catalyst suffered a substantially higher rate of breakage than did the lower activity catalyst. This is shown by the data in Table II.

Table II

| Catalyst Activity Index | Number of Cracking Regeneration Cycles | Carbon Deposit, Percent by Wt. of Cat. | | Carbon Burned Per Cycle, Percent Weight | Bead Breakage Per Cycle, Percent Weight |
| --- | --- | --- | --- | --- | --- |
| | | Spent | Regen. | | |
| 46 | 11 | 7 | 4.0 | 3.0 | 7 |
| 41 | 11 | 5.4–4.6 | 2.9–2.1 | 2.5 | 1 |
| 46 | 4 | 8.2 | 5.5 | 2.7 | 9 |
| 41 | 4 | 6.2–5.6 | 3.4–2.8 | 2.8 | 2 |

The catalyst activity index referred to in Tables I and II was determined by subjecting the catalyst to use for cracking a standard Mid-Continent gas oil stock under fixed standard cracking conditions followed by an analysis of the products to determine the 410° F. E. P. gasoline volumetric yield, the latter being the activity index number.

It has been found that when the "make-up" catalyst has an activity substantially equal to or less than that of the equilibrium catalyst in the cyclic conversion unit, excessive coke formation and residual deposits on the regenerated "make-up" catalyst and excessive breakage of the "make-up" catalyst relative to the equilibrium catalyst in the unit can be avoided.

Since the "make-up" catalyst has usually been exposed to the atmosphere and has adsorbed moisture therefrom, it has been found important to dry the "make-up" catalyst prior to supply to the substantially hotter catalyst in the cyclic system. The "make-up" catalyst may be dried by heating to a temperature within the range 300–500° F. with passage therethrough of air if desired. It has been found important in the case of silica-alumina gel bead catalyst that the moisture content thereof be reduced below about 2% and preferably below about 1% by weight prior to its addition to the hot cyclically moving stream, otherwise excessive breakage and cracking of the "make-up" catalyst will result due to moisture release at an excessively rapid rate. The moisture contents discussed hereinabove are on the basis of an assumed dry state for a catalyst which has been heated for ½ hour at 1000° F.

In general operation of cyclic systems, it has been found to be important to maintain the residual coke deposit on the regenerated catalyst below about 0.4% by weight and preferably below 0.25% by weight (calculated as carbon) in order to prevent excessive breakage of the catalyst. This is particularly important when the total carbon deposit on the spent catalyst exceeds about 4% by weight and it is desirable to limit the total deposit on the spent catalyst below about 3.0% and preferably below about 2.5% by weight of the catalyst in any case. These conditions may be maintained by proper control of the catalyst to oil ratio and the reactant space velocity when the "make-up" catalyst is of an activity below that of the original catalyst and not above that of the equilibrium catalyst in the cyclic system.

As an example, in a commercial operation for cracking conversion of a gas oil charge to gasoline containing product, a suitable original catalyst charge is a silica-alumina gel bead catalyst of 4–8 mesh (Tyler) size having an initial activity index of about 38. After several months' use in the cyclic operation the catalyst declined to an equilibrium activity index of about 32. The advantages offered by this invention may then be attained by replacing catalyst losses from the unit by addition to the system from time to time of a silica-alumina gel bead catalyst having an activity index of 30–32.

The initial activity of the catalyst employed as "make-up" catalyst may be controlled during the catalyst manufacture. For example, in the case of the gel bead catalysts the wet bead gel may be steam or hot water treated prior to drying or treated after drying at elevated temperatures of the order of 1350° F. with a steam air atmosphere to reduce the activity index to the desired level.

This invention should be understood to cover all changes and modifications of the examples of the invention herein chosen for purposes of disclosure which do not constitute a departure from the spirit and scope of the invention.

I claim:

1. In a cyclic process for the conversion of hydrocarbons wherein a stream of finely divided catalyst containing a substantial amount of inorganic oxide material selected from the group consisting of silica, alumina, and silica and alumina is passed cyclically through a conversion zone wherein it is contacted under suitable conversion conditions with a fluid hydrocarbon reactant to effect catalytic conversion of said hydrocarbons and through a regeneration zone wherein it is contacted with an oxygen containing gas to effect removal from the catalyst by burning of a carbonaceous contaminant deposited thereon in said conversion zone and the activity of said catalyst for promoting said conversion gradually declines with continued cyclic operation and wherein there is a gradual loss of catalyst volume in said stream during continued cyclic operation the improvement which comprises, replenishing any loss of catalyst volume in said catalyst stream by adding thereto as required catalyst having an activity for said conversion not substantially greater than the activity of the catalyst in said stream at the time of its addition and controlling the operation of said cyclic process to maintain the residual carbonaceous deposit, measured as carbon, on the catalyst discharging from the regeneration zone below about 0.4 percent by weight of the catalyst.

2. In a hydrocarbon conversion process wherein a particle form siliceous catalyst is passed cyclically through a conversion zone in contact with fluid hydrocarbons to effect a splitting conversion thereof and then through a regeneration zone in contact with an oxygen containing gas to effect removal from the catalyst by combustion of a carbonaceous contaminant deposited thereon in said conversion zone and wherein the catalyst suffers a gradual decrease in its activity for promoting said conversion and the stream a gradual loss in catalyst during continued cyclic operation, the improvement which comprises, controlling the operating conditions in said conversion and regeneration zones to maintain the carbonaceous deposit on the catalyst discharging from the regeneration zone below about 0.4 percent by weight of the catalyst and adding fresh make-up catalyst to the stream of cyclically moving catalyst as required during the cyclic operation to maintain the total catalyst volume substantially constant, said make-up catalyst having an activity substantially below that of the initial catalyst in said stream and not greater than the activity of the catalyst in said stream at the time of make-up catalyst addition, whereby excessive catalyst attrition is avoided in the cyclic operation.

3. In a process for catalytic cracking of hydrocarbons wherein a silica alumina bead gel catalyst is passed at elevated temperatures cyclically through a conversion zone in which it is contacted with a fluid hydrocarbon under elevated temperature conditions to effect the cracking conversion of said hydrocarbons to lower boiling products and through a regeneration zone in which it is contacted with an oxygen containing gas to burn off from the catalyst a carbonaceous contaminant deposited thereon in said conversion zone and wherein the catalyst incurs during its continued use in the cyclic conversion and regeneration operation a gradual decline from its original activity as charged for the cracking reaction to an equilibrium activity and wherein there is a gradual loss of catalyst from the cyclically moving stream thereof during its continued use in the cyclic operation the improvement which comprises, controlling the operating conditions in said conversion and regeneration zones to maintain the residual contaminant deposit calculated as carbon on the said catalyst which has reached equilibrium activity below about 0.25 percent by weight and supplying make-up bead catalyst of similar composition to the cyclically moving stream as needed to compensate for catalyst loss from said stream, the activity of said make-up catalyst being not greater than that of the original catalyst which has reached equilibrium activity and substantially below the activity of said original catalyst and said make-up catalyst being added at a substantially lower temperature than the cyclically moving stream but having been dried to a moisture content below about one percent by weight, whereby excessive breakage of make-up catalyst is avoided.

4. In a process for catalytic cracking of hydrocarbons wherein a silica alumina bead gel catalyst is passed at elevated temperatures cyclically through a conversion zone in which it is contacted with a fluid hydrocarbon under elevated temperature conditions to effect the cracking conversion of said hydrocarbons to lower boiling products and through a regeneration zone in which it is contacted with an oxygen containing gas to burn off from the catalyst a carbonaceous contaminant deposited thereon in said conversion zone and wherein the catalyst incurs during its continued use in the cyclic conversion and regeneration operation a gradual decline from its original activity as charged for the cracking reaction to an equilibrium activity and wherein there is a gradual volumetric loss of catalyst in the cyclically moving stream due to shrinkage and attrition during its continued cyclic use the improvement which comprises, controlling the operating conditions in said conversion and regeneration zones to maintain the contaminant deposit calculated as carbon on the equilibrium catalyst entering the regeneration zone and leaving the regeneration zone below about 3.0 and 0.4 percent by weight respectively and adding a silica-alumina gel bead make-up catalyst of substantially lower activity than the original catalyst charge to the cyclic operation as needed to compensate for the volumetric loss in said cyclically moving stream, the activity of said make-up catalyst being not greater than the equilibrium activity of the original catalyst at the time of addition of said make-up catalyst.

5. In a hydrocarbon conversion process wherein a particle form catalyst containing a substantial amount of inorganic oxide material selected from the group consisting of silica, alumina, and silica and alumina is passed cyclically through a conversion zone in contact with fluid hydrocarbons to effect a splitting conversion thereof and then through a regeneration zone in contact with an oxygen containing gas to effect removal from the catalyst by combustion of a carbonaceous contaminant deposited thereon in said conversion zone and wherein the catalyst suffers a gradual decrease in its activity for promoting said conversion and the stream a gradual loss in catalyst during continued cyclic operation, the improvement which comprises controlling the operating conditions in said conversion and regeneration zones to maintain the carbonaceous deposit on the catalyst entering the regeneration zone and leaving the regeneration zone below about 4.0 and 0.4% by weight respectively and adding fresh make-up catalyst as required during the cyclic operation to maintain the total catalyst volume substantially constant, said make-up catalyst having an activity not greater than the activity of the catalyst in said cyclically moving stream at the time of make-up catalyst addition, whereby excessive catalyst attrition is avoided in the cyclic operation.

References Cited in the file of this patent

UNITED STATES PATENTS

| | | |
|---|---|---|
| 2,253,486 | Belchetz | Aug. 19, 1941 |
| 2,396,285 | Perterkin | Mar. 12, 1946 |
| 2,399,678 | Houdry et al. | May 7, 1946 |
| 2,432,822 | Secor | Dec. 16, 1947 |